US005984270A

United States Patent [19]

Hussaini et al.

[11] Patent Number: 5,984,270

[45] Date of Patent: Nov. 16, 1999

[54] JACK SAFETY DEVICE

[75] Inventors: Saled Hussaini, Miami, Fla.; Liang Suchen, Kang Qiao Town, China

[73] Assignee: Rally Manufacturing, Inc., Miami, Fla.

[21] Appl. No.: 09/205,386

[22] Filed: Dec. 4, 1998

[51] Int. Cl.[6] ........................ B60P 1/48

[52] U.S. Cl. ........................ 254/8 B; 254/2 B

[58] Field of Search ........................ 254/8 B, 2 B

[56] References Cited

U.S. PATENT DOCUMENTS 5,221,073 6/1993 Shockley ........................ 254/8 B

*Primary Examiner*—Timothy V. Eley
*Assistant Examiner*—Benjamin Halpern
*Attorney, Agent, or Firm*—Liniak, Berenato, Lonagacre & White

[57] ABSTRACT

The invention is an improved jack having a safety device for preventing the jack from collapsing under a heavy load. The improved jack includes a linkage movable from a lowered position to an elevated position for engaging and elevating a load, an actuating mechanism connected to the linkage for moving the linkage toward the elevated position upon actuation of the actuating means, and the safety device blocking mechanism for blocking movement of the linkage from the elevated position to the lowered position. The linkage is supported and disposed for pivotal movement between two side plates. The blocking mechanism provides an abutment across the two side plates to limit the movement of linkage. The blocking mechanism features a block fixed to the linkage. The block has horizontal bores passing therethrough. A lock rod is inserted through the horizontal bores to provide an abutment across the two side plates when the linkage is elevated, thereby preventing the linkage from unintentionally lowering.

10 Claims, 2 Drawing Sheets

JACK SAFETY DEVICE

BACKGROUND OF THE INVENTION

The present invention is related to a car jack safety, and more particularly to an improved car jack having a safety device which can prevent unintentional lowering of the jack when it is supporting a heavy load, for example. More specifically, the present invention is related to an improved full-size hydraulic floor jack. However, the safety device according to the present invention can be used in other jacks, such as manual jacks and more compact frame-type jacks.

All types of conventional car jacks have a common disadvantage that they cannot prevent an unintentional lowering of the jack when supporting a lifted load. This is particularly true for a hydraulic type jack since a hydraulic driving mechanism is less reliable than a threaded type driving mechanism.

An unintentional lowering of the jack is very dangerous to a person working underneath a lifted car for maintenance or repairs. Most often, fixed supports are supposed to be positioned in a supporting position under the lifted car, to avoid the danger caused by an unintentional lowering of the jack. However, sometimes this precaution is overlooked, due to additional expense of the fixed supports or a preference to used a stack of bricks or some other type of make-shift support. These supports can be unsecured and the potential for danger to a person under the lifter load is not prevented.

Accordingly, it is an object of the invention to provide a new and improved safety device for a hydraulic jack.

It is another object of the invention to provide a hydraulic jack which has a safety device of simple construction which will prevent unintentional lowering of the jack.

It is another object of the invention to provide an safety mechanism which is easy to use and which ensures that the jack will not collapse.

It is a further object of the invention to provide a jack safety device which is clearly visible to an operator to ensure the safety device is in use when needed.

SUMMARY OF THE INVENTION

The invention is an improved jack which includes a linkage movable from a lowered position to an elevated position for engaging and elevating a load, an actuating mechanism connected to the linkage for moving the linkage toward the elevated position upon actuation of the actuating means, and blocking mechanism for blocking movement of the linkage from the elevated position to the lowered position. The linkage is supported and disposed for pivotal movement between two side plates. The blocking mechanism provides an abutment across the two side plates to limit the movement of linkage.

The blocking mechanism includes block fixed to the linkage. The block has horizontal bores passing therethrough. A lock rod is insertable through the horizontal bores to provide an abutment across the two side plates.

Alternatively, the blocking mechanism includes a pair of brackets fixed to the two side plates respectively. The brackets are provided with horizontally aligned holes passing therethrough. A lock rod is insertable through the horizontally aligned holes to provide an abutment across the two side plates.

The jack safety device features a lock rod having a rod head on an end with a diameter larger than a diameter of the holes. Then, only an opposing end of the lock rod is insertable through the holes.

The jack actuating mechanism may be a hydraulic actuating mechanism which can be manually of electrically operated.

The jack actuating mechanism may be a threaded shaft which actuates the linkage by a rotational movement of the threaded shaft.

The invention features a jack including a pair of parallel plates and a lifting mechanism supported by and disposed pivotably between the parallel plates. The lifting mechanism includes a pivotable arm having a first end which pivots from a lowered position in between the plates to an elevated position above the plates. The second end of the arm is pivotably attached to the plates. Two brackets are mounted to the two plates so as to be parallel to one another and disposed horizontally across from one another. At least one pair of horizontally aligned holes are defined in the brackets in a vertical position disposed beneath the first end of the pivotable arm when in the elevated position. A lock rod can be inserted into and extended through the pair of aligned holes defined in the brackets such that when the arm is in the elevated position the lock rod can be inserted into the pair of holes to limit the movement of the arm from the elevated position back to the lowered position.

The brackets preferably have at least two pairs of horizontally aligned holes.

These and other features of the invention will become apparent to those skilled in the art when taken in connection with the following description and drawings.

DETAILED DESCRIPTION OF THE INVENTION

Figure 1:
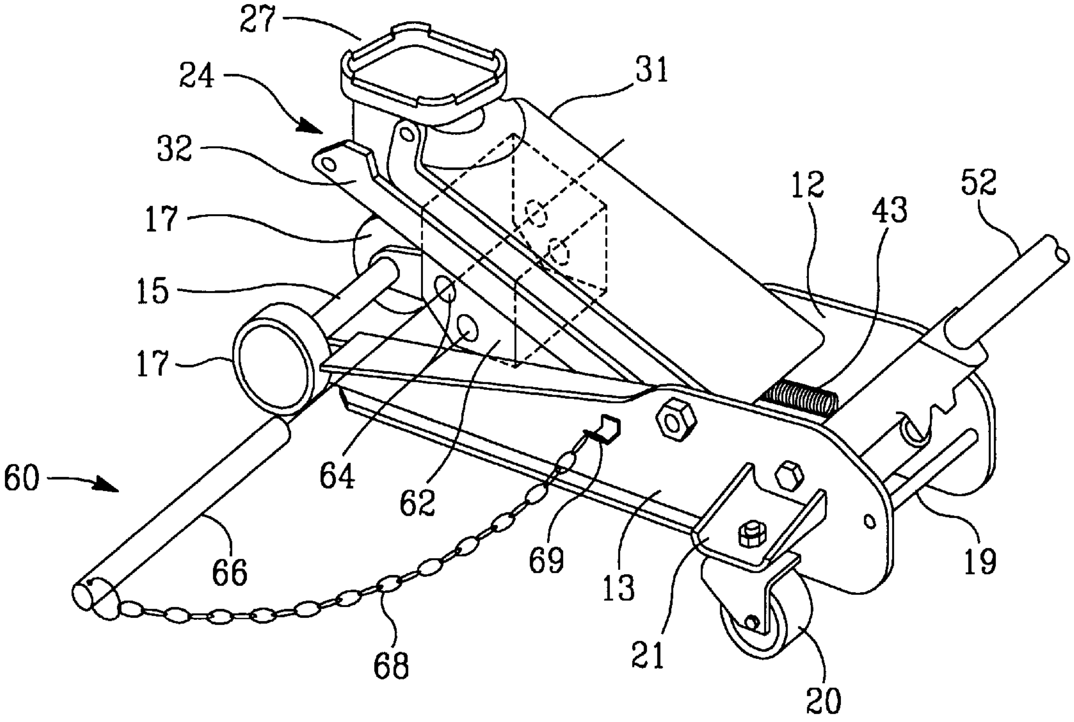
FIG. 1 is a perspective view illustrating a jack incorporating a safety device of the present invention.
Figure 2:
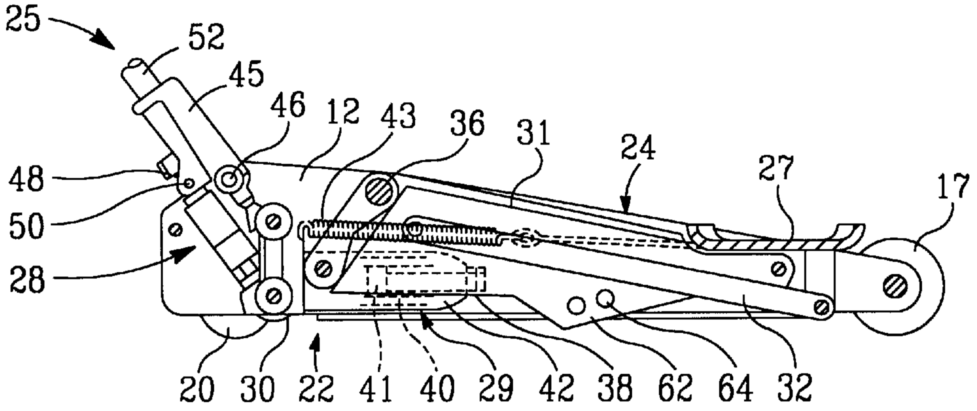
FIG. 2 is a side elevation view of the jack illustrated in FIG. 1.

Referring now to FIGS. 1 and 2, a hydraulic jack 10 is shown employing the jack safety device according to the invention. Those skilled in the art will appreciate that the illustrated jack is intended as an example only and that the safety device according to the invention may be employed in other types of jacks as well.

The jack includes a frame consisting of a pair of side plates 12, 13. The front end of the plates 12, 13 are joined in a parallel, spaced apart relation by a tubular member 15 which houses an axle for a pair of front wheels 17. The opposite ends of the side plates 12, 13 are suitable joined by a cross brace 19 and are supported by a pair of caster wheels 20 mounted on brackets 21.

Mounted between the plates 12, 13 is a hydraulic assembly 22 and a linkage assembly 24. The hydraulic assembly is operated by a handle mechanism 25 which moves the linkage assembly from a retracted position shown in FIG. 2, to an advanced, elevated position shown in FIG. 1. The extension of the linkage assembly to the advanced position lifts a crank arm 31 to a raised position. Mounted on the crank arm 31 is a lift cap 27 which engages a load to be lifted, such as a car frame.

The hydraulic assembly includes a pump assembly 28, a hydraulic ram assembly 29, and a valve block assembly 30 for interconnecting the pump assembly 28 to the ram assembly 29. The linkage assembly includes a crank arm 31 and a pair of links 32. The crank arm 31 is pivotally mounted on a fulcrum pin 36 extending between the plates 12, 13. The links are pivotally mounted at a bottom end to the side plates 12, 13 and at a top end to the free end of the crank arm 31, under the lift cap 27. The linkage assembly 24 fits entirely between the side plates 12, 13.

A plunger 38 engages the crank arm 31 below the fulcrum pin 36 such that movement of the plunger 38 outward from the ram 29 causes counterclockwise pivoting of the crank arm 31 as viewed in FIG. 2. The ram assembly also includes a cylinder 40 and piston 41 movable therein and coupled to the plunger 38. Surrounding the cylinder 40 is a housing 42 which acts as a reservoir or sump. A spring member 43 extends between the valve block 30 and the crank arm 31 for biasing the crank arm 31 toward the lowered position shown in FIG. 2.

A handle assembly 25 includes a socket 45 pivotally mounted on a pin 46 which extends between the plates 12, 13. A lower portion of the socket carries a member 50 which engages the pump assembly during operation of the handle assembly. The socket 45 is provided with a recess for receiving a handle 52 to facilitate operation.

The safety device 60 according to a first embodiment of the invention includes a block 62 mounted onto the underside of the crank arm 31. The block 62 may be an integral part of the crank arm 31 or may be suitably welded to the crank arm prior to or during typical manufacturing processes or after product delivery in a mod-kit which can be installed onto a jack as an upgrade by appropriate service personnel. The block is shown as having two horizontal bores 64 which pass through the block. The block is designed with a width which is the same or less than the width of the crack arm, and a thickness such that the block will not interfere with the raising and lowering of the crank arm, as can be best seen in FIG. 2. A lock rod 66 is provided which has a diameter slightly less than that of the holes 64, and a length substantially longer than the width between the outer sides of the side plates 12, 13. When the lift cup 27 is in a raised position, the lock rod 66 is inserted horizontally into and through one of the bores 64 in the block at a position beneath the lift cup 27. The lock rod 66 extends between the two side plates 12, 13, to block the lowering of the crack arm 31 to a collapsed position. The lock rod 66 stops the crank arm 31 from lowering beyond the position where the lock rod 66 would encounter and abut against the top side of both of the side plates 12, 13. A chain 68 and lock rod mounting bracket 69 are provided for attaching the lock rod 66 to a side plate of the jack and for storing the lock rod when not in use.

Figure 3:
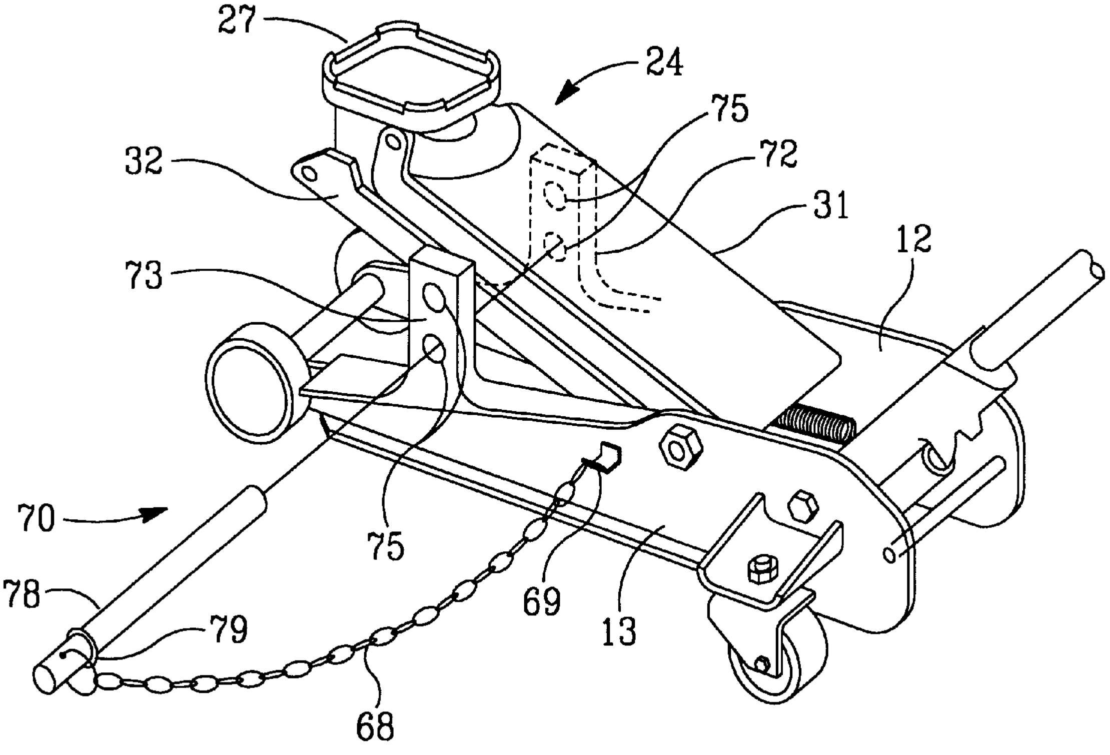
FIG. 3 is a perspective view illustrating a jack incorporating a second embodiment of the safety device according to the invention.

Referring now to FIG. 3 a safety device 70 according to a second embodiment of the invention, includes a pair of upright brackets 72, 73 fixed to the upper sides of the side plates 12, 13, respectively. The brackets are positioned on the side plates so as not to interfere with the raising or lowering of the linkage assembly 24, enabling the links 32, the lift cup 27, and the crank arm 31 to pass therebetween. The brackets 72, 73 are provided with multiple pairs of horizontally aligned holes 75. A lock rod 78 is provided which has a diameter slightly less than that of the holes 75, and a length substantially longer than the width between the outer sides of the brackets 72, 73 so that the lock rod 78 is sure to be securely supported between the brackets 72, 73. When the lift cup 27 is in a raised position, the lock rod 78 is inserted horizontally into a pair of the holes 75 at a position beneath the lift cup 27. The lock rod 78 extends between the two brackets 72, 73, to block the lowering of the crack arm 31 to a collapsed position. The lock rod 78 stops the crank arm 31 from lowering beyond the position where the crack arm encounters and abuts the lock rod.

Additionally, a rod head 79 can be provided on one end of the lock rod 78. The rod head 79, having a diameter larger than the bores 64 or holes 75, abuts against the outer side of the block 62 or bracket 72 when the lock rod is fully inserted therethrough, to ensure that the lock rod is properly positioned.

In the case of unintentional lowering of the jack, due to failure of the lifting mechanism or unintentional release of the lifting mechanism, the jack is prevented from completely collapsing under a supported load, thereby avoiding potentially life-threatening harm to a person working under the load. The position of the safety device 60, 70 is such that it can be easily viewed by an operator to check that the lock rod is positioned after lifting a load.

In operation, the jack 10 is positioned such that the lifting cap 27 is located below that portion of the vehicle or other object that is to be lifted. The handle is inserted into the socket 45 and is manually raised and lowered thereby engaging the member 50 with the pump assembly 28. Fluid is delivered through the pump assembly to the ram assembly to effectively move the plunger 38 outwardly from the cylinder 40, as will be understood by those skilled in the art. The linkage assembly 24 effectively raises the lift cap 27 to the desired elevated position, as the handle is continually raised and lowered.

The lock rod of the safety device 60 according to the first embodiment is inserted through an appropriate bore 65 in the block 62, or the lock rod is inserted through a pair of the aligned holes 75 in the brackets 72, 73, as in the second embodiment of the safety device 70, to prevent the crank arm 31 from lowering to the original position. When the jack is to be lowered, the lock rod is removed from the safety device. A release valve (not shown) is provided in the pump assembly 28 which may be operated in the manner well known in the art when it is desired to lower the load.

It will be appreciated that in addition to the above described manually-operated hydraulic lift system, the plunger 38 can be moved by an electrically-operated hydraulic system. Furthermore, other types of actuators can be employed, such as those which replace the pump assembly and ram assembly with a conventional threaded shaft which is extended by a rotating action.

While the invention has been described with references to several embodiments, the description is illustrative and is not to be construed as limiting the scope of the invention. Various modifications and changes may occur to those skilled in the art without departing from the spirit and scope of the invention as defined by the appended claims.

What is claimed is:

1. A jack comprising a linkage means movable from a lowered position to an elevated position for engaging and elevating a load, an actuating means connected to the linkage means for moving the linkage means toward the elevated position upon actuation of the actuating means, and blocking means for blocking movement of the linkage means from the elevated position to the lowered position, wherein said linkage means is supported and disposed for pivotal movement between two side plates and said blocking means provides an abutment across the two side plates to limit the movement of linkage means, and wherein said blocking means includes a block fixed to said linkage means, said block having horizontal bores passing therethrough, and a lock rod insertable through said horizontal bores to provide said abutment across the two side plates.

2. The jack according to claim 1, wherein said lock rod has a rod head on an end of said lock rod having a diameter larger than a diameter of said bores such that only an opposing end of said lock rod is insertable through said bores.

3. The jack according to claim 1, wherein said actuating means is a hydraulic actuating means.

4. The jack according to claim 1, wherein said actuating means comprises a threaded shaft which actuates said linkage means by a rotational movement of said threaded shaft.

5. The jack according to claim 3, wherein said hydraulic actuating means is manually operated.

6. The jack according to claim 3, wherein said hydraulic actuating means is electrically operated.

7. A jack comprising a pair of parallel plates, a lifting mechanism supported by and disposed pivotably between the parallel plates, said lifting mechanism including a pivotable arm having a first end which pivots from a lowered position in between the plates to an elevated position above the plates and a second end pivotably attached to the plates, brackets mounted to each of the two plates so as to be parallel to one another and disposed horizontally across from one another, at least one pair of horizontally aligned holes defined in the brackets in a vertical position disposed beneath the first end of the pivotable arm when in the elevated position, and a lock rod to be inserted into and extended through the pair of aligned holes defined in said brackets such that when said arm is in the elevated position the lock rod can be inserted into the pair of holes to limit the movement of the arm from the elevated position back to the lowered position.

8. The jack according to claim 7, wherein said brackets have at least two pairs of horizontally aligned holes.

9. A jack comprising a pair of parallel plates, a lifting mechanism supported by and disposed pivotably between the parallel plates, said lifting mechanism including a pivotable arm having a first end which pivots from a lowered position in between the plates to an elevated position above the plates and a second end pivotably attached to the plates, a block mounted to an underside of said pivotable arm, at least one horizontal bore defined in the block disposed beneath the first end of the pivotable arm when in the elevated position, and a lock rod to be inserted into and extended through the bore defined in said block such that when said arm is in the elevated position the lock rod can be inserted into the bore to limit the movement of the arm from the elevated position back to the lowered position.

10. The jack according to claim 9, wherein said block has at least two horizontal bores.

* * * * *